United States Patent [19]

Umland

[11] Patent Number: 5,302,315

[45] Date of Patent: Apr. 12, 1994

[54] VULCANIZATION ACTIVATOR METHOD

[75] Inventor: Henning Umland, Winsen/Luhe, Fed. Rep. of Germany

[73] Assignee: Schill & Seilacher (GmbH & Co.), Hamburg, Fed. Rep. of Germany

[21] Appl. No.: 925,237

[22] Filed: Aug. 3, 1992

Related U.S. Application Data

[63] Continuation-in-part of Ser. No. 405,556, Sep. 11, 1989, abandoned.

[30] Foreign Application Priority Data

Sep. 20, 1988 [DE] Fed. Rep. of Germany ....... 3831883

[51] Int. Cl.$^5$ ............................................. C09G 3/00
[52] U.S. Cl. ......................... 252/182.14; 252/182.12; 252/182.17; 252/182.18
[58] Field of Search ...................... 252/182.12, 182.14, 252/182.3, 182.18

[56] References Cited

U.S. PATENT DOCUMENTS

| | | | |
|---|---|---|---|
| 3,872,054 | 3/1975 | Shaw | 524/864 |
| 3,915,943 | 10/1975 | Wright | 260/85.1 |
| 4,075,159 | 2/1978 | Koyama et al. | 260/42.47 |
| 4,076,668 | 2/1978 | Kaveda et al. | 260/23.7 M |
| 4,310,443 | 1/1982 | Maeda et al. | 525/193 |
| 4,423,182 | 12/1983 | Bartman | 524/367 |
| 4,452,186 | 9/1985 | Giller et al. | 525/138 |
| 4,465,807 | 8/1984 | Giller et al. | 525/135 |
| 4,623,680 | 11/1986 | Azarnia et al. | 523/412 |
| 4,895,911 | 1/1990 | Mowdood et al. | 524/313 |
| 4,952,634 | 8/1990 | Grossman | 525/190 |

OTHER PUBLICATIONS

Morrison et al., *Organic Chemistry*, pp. 434, 435, 438 & 439, Allyn & Bacon (1959) Boston.

*Primary Examiner*—Edward A. Miller
*Attorney, Agent, or Firm*—Collard & Roe

[57] ABSTRACT

A vulcanization activator based upon zinc salts of organic carboxylic acids for rubber compounds, which may be vulcanized with sulfur, is disclosed. The vulcanization activator includes homogeneous mixed zinc salts of the following acids:

(a) at least one carboxylic acid of the general formula R—COOH, in which R is an alkyl group having 5 to 17 carbon atoms, or a cycloalkyl group having 5 to 17 carbon atoms; and (b) an aromatic carboxylic acid, in which the molar ratio of component (a) and component (b) of the homogeneous zinc-mixed salt is preferably in the range of 1:19 to 19:1.

A process for the preparation of the vulcanization activator of the invention is also disclosed.

20 Claims, 1 Drawing Sheet

VULCANIZATION ACTIVATOR METHOD

This is a continuation-in-part of copending application Ser. No. 07/405,556 filed on Sep. 11, 1989, now abandoned.

The present invention relates to a vulcanization activator and a process for its preparation. More particularly, the present invention relates to a vulcanization activator based on zinc salts of organic carboxylic acids for a rubber compound to be vulcanized with sulfur.

It is known from *Ullmanns Encyklopädie der technischen Chemie*, vol. 9, 1957, p. 387, that the system rubber-sulfur-accelerator zinc oxide can be additionally activated by adding fatty acids, such as stearic acid or zinc salts of fatty acids, such as zinc stearate or zinc lauarate. These activators lead to an additional improvement in the mechanical characteristics of the vulcanized rubber and, in part, to a shortening of the vulcanization time. In addition, fatty acids and fatty acid salts lead to an improvement in the processibility and, often reduce the risk of premature cross-linking of the rubber compound during the various processing steps.

It is further known from R. F. Grossman et al *Rubber and Plastic News*, 1987, how to use zinc salts of an aromatic carboxylic acid, such as, e.g., terephathalic acid. However, due to the high melting point thereof, it is generally only possible to prepare the same by precipitation, instead of using the more cost-effective melt process, namely, the reaction of zinc oxide with carboxylic acid in the molten state. As a further result of the high melting point, zinc salts of such aromatic carboxylic acids are often difficult to disperse homogeneously in the rubber compound.

It is, therefore, an object of the present invention to provide an improved, low-melting vulcanization activator, which can be homogeneously dispersed in rubber at common mixing temperatures and which provides a more efficient cross-linking of the rubber compound during the vulcanization process, resulting in a higher elastic modulus of the vulcanized rubber, as well as retarded reversion (thermal crosslink degradation on overcure).

It is a further object of the present invention to provide a simple and cost effective process for the preparation of a vulcanization activator containing zinc salts of aromatic carboxylic acids.

It has surprisingly been discovered that the foregoing and related objects are accomplished by a vulcanization activator of mixed zinc salts of a carboxylic acid, or a carboxylic acid mixture, of the general formula R—COOH, in which R stands for an alkyl, or cycloalkyl radical with 5 to 17 and, preferably, 7 to 11 carbon atoms, and further of an aromatic carboxylic acid. The vulcanization activator can be prepared as a homogenous, low melting material and can be homogeneously dispersed in the rubber. Compared with the activators known to the prior art, such as stearic acid, zinc stearate and zinc-2-ethyl capronate, the activator of the present invention gives longer reversion times during vulcanization and provides vulcanizates with a higher elastic modulus. In addition, the vulcanizates have a reduced compression set, a higher thermal stability, and a better dynamic loadability.

The aromatic carboxylic acid can be either substituted or unsubstituted. There is the proviso that the carboxylic acid be different from the aromatic carboxylic acid.

The process, according to the invention, involves reacting 1 to 1.5 moles of zinc oxide, zinc hydroxide or zinc carbonate with 2 moles of a carboxylic acid mixture comprising 0.1 to 1.9 mole of carboxylic acid or a carboxylic acid mixture of the aforementioned formula and 0.1 to 1.9 mole of an aromatic carboxylic acid; particular preference being given to benzoic acid or substituted benzoic acids, such as, e.g., chlorobenzoic acid or methylbenzoic acid. Other suitable aromatic carboxylic acids are of a polycyclic nature, such as, e.g., naphthoic acid and the substitution products thereof, as well as carboxylic acids of heterocyclic aromatics.

Generally, the carboxylic acid mixture is heated to a temperature of 100° to 200° C. and is reacted with the zinc compound while mixing under stirring. The volatile reaction products or by-products, such as water and/or carbon dioxide, are thereby removed. Following the cooling of the melt, hard wax-like products are obtained, which can be pelletized or filled from the melt in conventional installations.

It has been found that the use as a vulcanization activator of a homogeneous eutectic mixture of zinc salts of organic acids, in particular, zinc octoate and zinc benzoate, lead to advantages in comparison to the use of a mixture of zinc salts of organic acids which do not form such a eutectic mixture.

The eutectic mixture of zinc octoate and zinc benzoate has a melting point of 100° C. and is soluble in the rubber to be vulcanized at this temperature. In contrast to this, zinc benzoate, which is a good activator, as such is unmeltable and cannot be incorporated homogeneously into the rubber to be treated. Zinc octoate melts at 150° C., which is considerably higher than the melting point temperature of the above eutectic mixture.

By using such a eutectic mixture, the degree of cross-linking can be increased. This results in a higher E-modulus of the vulcanized rubber. Further, the use of the eutectic mixture leads to a higher resistance against reversion, which is the resistance against over vulcanization. Consequently, the processing is facilitated because reversion starts later (longer reversion time) during vulcanization. Additionally, the vulcanizates have a reduced compression set, a higher thermal stability and a better dynamic loadability which result in longer life-times when using the vulcanized rubber at high temperatures.

It is also possible to use as the vulcanization activator a homogeneous eutectic mixture of zinc octoate and zinc 2-methylbenzoate; or a homogeneous eutectic mixture of zinc octoate and zinc 2-chlorobenzoate.

More particularly, the present invention achieves these objects and advantages by providing a method for vulcanization of rubber, which is capable of being vulcanized with sulfur, comprising:

adding to said rubber which is to be vulcanized a vulcanization activator comprising a homogeneous eutectic mixture of zinc salts of the following acids:

(a) at least one carboxylic acid of the formula R—COOH, wherein R is a radical selected from the group consisting of an alkyl group having 5 to 17 carbon atoms and a cycloalkyl group having 5 to 17 carbon atoms; and (b) an unsubstituted or substituted aromatic carboxylic acid;

and in that the molar ratio of said component (a) and said component (b) of said homogeneous mixed zinc salts is 1:19 to 19:1.

The rubber is selected from the group consisting of natural rubber, polyisoprene rubber, polybutadiene, styrene-butadiene rubber, nitrile rubber, ethylene-propylene-diene-terpolymer (EPDM), chloroprene rubber and butyl rubber or mixtures thereof.

The carboxylic acid (a) of the vulcanization activator is an aliphatic carboxylic acid and which contains a radical R having from 7 to 11 carbon atoms.

The aromatic carboxylic acid (b) of the vulcanization activator is preferably unsubstituted or substituted benzoic acid. Examples of the substituted benzoic acid is selected from the group consisting of chlorobenzoic acid and methyl-benzoic acid.

In addition to the rubber and the vulcanization activator, a vulcanization accelerator can be used which is selected from the group consisting of thiazoles and sulfenamides.

Suitable examples of a vulcanization accelerator include 2-mercaptobenzothiazole (MBT), N-cyclohexyl-benzothiazolyl-sulfenamide (CBS), N,N-dicyclohexyl-benzothiazolyl-sulfenamide (DCBS), N-morpholinyl-benzothiazolyl-sulfenamide (MBS) or N-tert.-butyl-benzothiazolyl-sulfenamide (TBBS).

The present invention will now be described in greater detail, with reference being made to the following examples, which further include reference to the accompanying drawing figure and tables, which illustrate the results of comparison testing procedures.

It should be understood, however, that the accompanying examples and test results are intended as being merely illustrative of the present invention and are not intended as defining the scope thereof.

EXAMPLE 1

1.0 mole of zinc oxide was introduced, accompanied by stirring, into a mixture of 1.4 moles of $C_8$ to $C_{10}$-coconut fatty acid and 0.6 mole of benzoic acid heated to 150° C. The resulting mixture was then maintained at this temperature until no further water vapor emerged. The clear melt obtained, following cooling, gave a colorless, brittle material with a drop point of 100° C. Compared with this product, the melting points of the individual zinc salts were found as follows: zinc caprylate: 138° C. zinc caprate: 135° C. zinc benzoate: >190° C.

EXAMPLE 2

The procedures described in Example 1 were followed except, in this case, use was made of a mixture of 1.4 mole of a $C_8$ to $C_{10}$-coconut fatty acid and 0.6 mole of 2-methylbenzoic acid. A colorless material with a drop point of 99° C. was obtained.

EXAMPLE 3

The procedures described in Examples 1 and 2 were again followed, however, the carboxylic acid mixture was constituted by a mixture of 1.4 mole of a $C_8$ to $C_{10}$-coconut fatty acid and 0.6 mole of 2-chlorobenzoic acid. A colorless material with a drop point of 103° C. was obtained.

EXAMPLE 4

A natural rubber compound with the following formulation was prepared:

| Constituents | Parts by Weight |
| --- | --- |
| Natural rubber (RSS 1) | 100 |
| Carbon black N-330 | 40 |
| ZnO | 5 |
| Antioxidant (TMQ) | 1 |
| Accelerator | 0.5 |
| Sulfur | 2.5 |

For a comparative evaluation, the accelerator consisted of N-morpholinyl benzothiacyl sulfenamide and the accelerator activator was comprised, on the one hand, by 1 or 3 or 5 parts by weight of stearic acid (tests 1 to 3) and, on the other hand, 1 or 3 or 5 parts by weight of the activator prepared according to Example 1 (tests 4 to 6), as well as 5 parts by weight of an activator according to Example 2 (test 7) and 5 parts by weight of an activator according to Example 3 (test 8).

The physical data are given in the following Table I, namely:

(a) The vulcanization time at 160° C.;

(b) The 300% modulus, measured according to DIN 53 504 in MPa;

(c) The tensile strength according to DIN 53504;

(d) The elongation in percent according to DIN 53504;

(e) The vulcanization data determined at 160° C. with a Monsanto rheometer, namely:

$t_2$ The scorch time in minutes; the time after which the rotor torque had risen by 2 units was measured;

$t_{90}$ The time after which 90% of the maximum rotor torque was reached;

$t_{95R}$ The time required by the torque acting on the rotor to drop from the vulcanization optimum (100%) to 95% and corresponding to the reversion time.

(f) The reversion stability, measured as the quotient of $t_{95R}:t_{90}$;

(g) The compression set of the vulcanizate, measured in percent according to DIN 53517;

(h) The dynamic loadability of the vulcanizate determined with a compression flexometer (according to Goodrich); through the temperature rise of the testpiece following a clearly defined number of deformation cycles at the given frequency and by the permanent set of the test pieces following the measurement.

It is possible, on the basis of the reversion times measured, to draw conclusions regarding the thermal stability because the overvulcanization, in principle, represents an anaerobic thermal aging.

Table I clearly shows a considerable improvement to the reversion times and the compression set, as well as a rise in the moduli.

Figure 1:
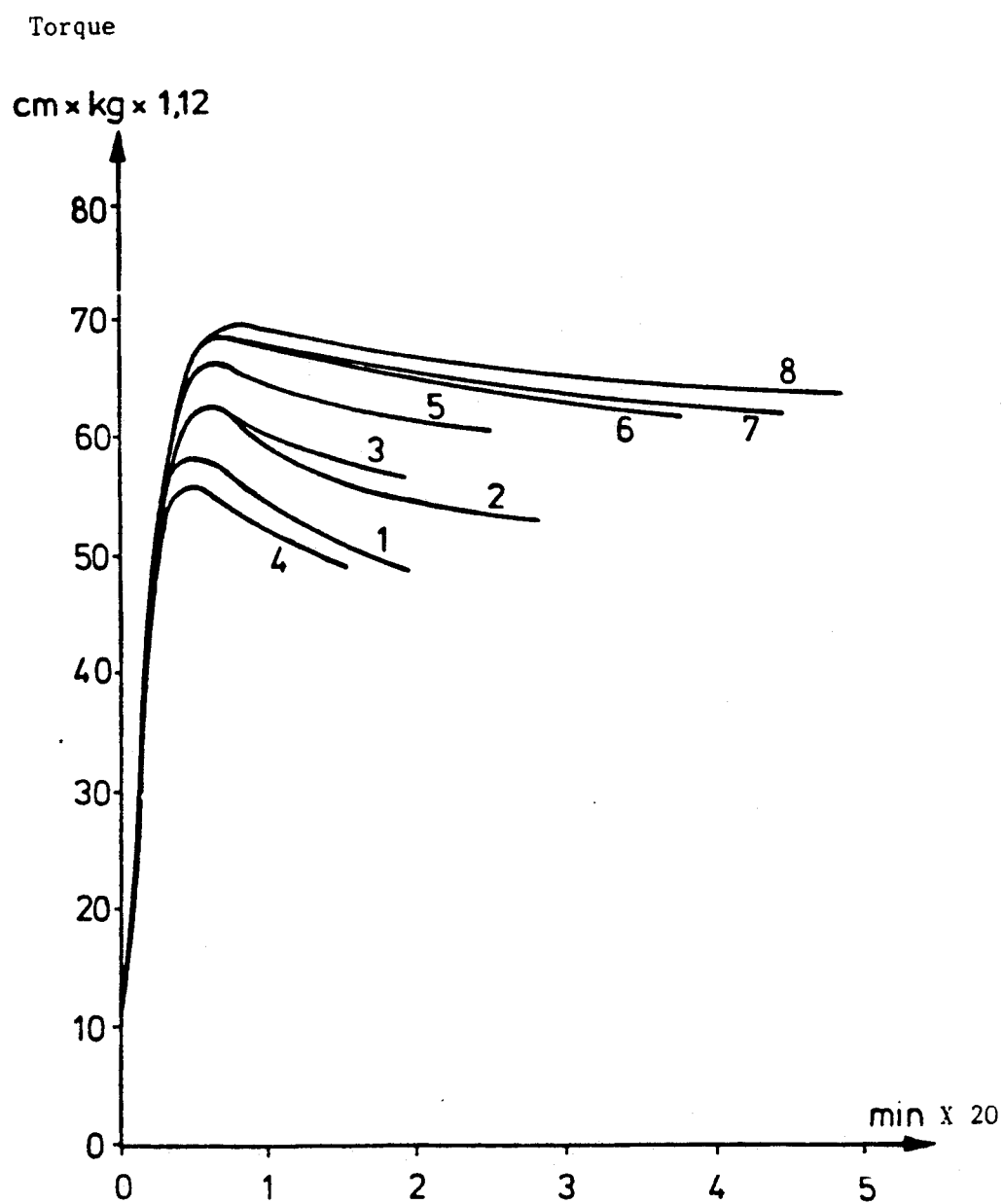
FIG. 1 is a graph of the reversion times of the individual tests 1 to 8.

Table II shows the improvement of the dynamic loadability, apparent from the lower temperature rise of the test specimens or the longer life of the latter. Conventional activators, such as stearic acid, zinc stearate and zinc-2-ethyl capronate were used as reference materials.

The reduced permanent set following the test also reveals the improved dynamic loadability of the vulcanizates.

While only several embodiments of the present invention have been shown and described, it will be obvious to those of ordinary skill in the art that many modifications may be made to the present invention, without departing from the spirit and scope thereof.

TABLE I

| Test | 1 | 2 | 3 | 4 | 5 | 6 | 7 | 8 |
|---|---|---|---|---|---|---|---|---|
| Stearic acid | 1 part | 3 parts | 5 parts | | | | | |
| Activator Ex. 1 | | | | 1 part | 3 parts | 5 parts | | |
| Activator Ex. 2 | | | | | | | 5 parts | |
| Activator Ex. 3 | | | | | | | | 5 parts |
| Vulcanization times (min) | 15 | 15 | 16 | 14 | 16 | 20 | 20 | 20 |
| 300% modulus [MPa] | 7.8 | 9.2 | 8.9 | 8.2 | 11.1 | 12.0 | 13.4 | 13.4 |
| Tensile strength [MPa] | 23.6 | 26.0 | 26.4 | 24.3 | 26.0 | 23.0 | 23.0 | 25.4 |
| Elongation [%] | 580 | 580 | 640 | 610 | 560 | 470 | 430 | 480 |
| Vulcanization data - Monsanto rheometer, 160° C. | | | | | | | | |
| $t_2$ [min] | 2.8 | 2.8 | 2.5 | 2.5 | 2.3 | 2.6 | 2.5 | 2.3 |
| $t_{90}$ [min] | 8.2 | 9.0 | 9.6 | 8.0 | 8.9 | 10.2 | 10.6 | 10.2 |
| $t_{95R}$ [min] | 28 | 32 | 35 | 28 | 45 | 75 | 85 | 70 |
| $t_{95R}:t_{90}$ | 3.4 | 3.6 | 3.6 | 3.5 | 5.1 | 7.4 | 8.0 | 6.9 |
| Compression set [%] | | | | | | | | |
| at 24 h, 70° C. | | | 38 | | | 26 | | |
| at 24 h, 50° C. | | | 23 | | | 14 | | |

TABLE II

| Dynamic Loadability. Measured on the Goodrich Flexometer | | | | |
|---|---|---|---|---|
| Chamber temperature [°C.] | | 100 | | |
| Stroke [in cm × 2.4] | | 0.175 | | |
| Statis load [in kg × 0.45] | | 30 | | |
| Frequency [in s$^{-1}$] | | 30 | | |
| Activator Used (per 5 parts) | | | | |
| | Stearic Acid | Zn-Stearate | Zn-2-ethyl capronate | Activator in Ex. 1 |
| Testpiece temperature rise [°C.] | | | | |
| after 2000 seconds | 21 | 23 | 34 | 22 |
| after 3000 seconds | 25 | 27 | (testpiece destroyed) | 25 |
| after 6000 seconds | 39 | 41 | (testpiece destroyed) | 30 |
| Testpiece permanent set [%] | | | | |
| after 7200 seconds | 33 | 34 | (testpiece destroyed) | 23 |

What is claimed is:

1. A method for preparing rubber for sulfur vulcanization, comprising:
    adding to said rubber, which is to be vulcanized, a vulcanization activator, comprising
    a homogeneous eutectic mixture of zinc salts of the following acids:
    (a) at least one carboxylic acid of the formula R—COOH, wherein R is a radical selected from the group consisting of an alkyl group having 5 to 17 carbon atoms and a cycloalkyl group having 5 to 17 carbon atoms; and
    (b) an unsubstituted or substituted aromatic carboxylic acid;
    and in that the molar ratio of component (a) and component (b) of said homogeneous mixture of zinc salts is such that the zinc salt mixture is eutectic, and within the range of 1:19 to 19:1.

2. The method according to claim 1, wherein the rubber is selected from the group consisting of natural rubber, polyisoprene rubber, polybutadiene, styrene-butadiene-rubber, nitrile rubber, ethylene-propylene-diene-terpolymer (EPDM), chloroprene rubber and butyl rubber or mixtures thereof.

3. The method according to claim 1, wherein the carboxylic acid (a) of the vulcanization activator contains a radical R having from 7 to 11 carbon atoms.

4. The method according to claim 1, wherein the aromatic carboxylic acid (b) of the vulcanization activator is unsubstituted or substituted benzoic acid.

5. The method according to claim 4, wherein said substituted benzoic acid is selected from the group consisting of chlorobenzoic acid and methyl-benzoic acid.

6. The method according to claim 1, further comprising adding to the rubber and the vulcanization activator, a vulcanization accelerator which is selected from the group consisting of thiazoles and sulfenamides.

7. The method according to claim 6, wherein the vulcanization accelerator is 2-mercaptobenzothiazole (MBT), N-cyclohexyl-benzothiazolyl-sulfenamide (CBS), N,N-dicyclohexyl-benzothiazolyl-sulfenamide (DCBS), N-morpholinyl-benzothiazolyl-sulfenamide (MBS) or N-tert.-butylbenzothiazolyl-sulfenamide (TBBS).

8. The method according to claim 1, wherein said vulcanization activator comprises a homogeneous eutectic mixture of zinc octoate and zinc benzoate.

9. The method according to claim 1, wherein said vulcanization activator comprises a homogeneous eutectic mixture of zinc octoate and zinc 2-methylbenzoate.

10. The method according to claim 1, wherein said vulcanization activator comprises a homogeneous eutectic mixture of zinc octoate and zinc 2-chlorobenzoate.

11. A method for preparing rubber for sulfur vulcanization, comprising:
    adding to said rubber, which is to be vulcanized, a vulcanization activator, comprising
    a homogeneous mixture of zinc salts of the following acids:
    (a) at least one carboxylic acid of the formula R—COOH, wherein R is a radical selected from the group consisting of an alkyl group having 5 to 17 carbon atoms and a cycloalkyl group having 5 to 17 carbon atoms; and (b) an unsubstituted or substituted aromatic carboxylic acid;
and in that the molar ratio of component (a) to component (b) of said homogeneous mixture of zinc salts is 1:19 to 19:1.

12. The method according to claim 11, wherein the rubber is selected from the group consisting of natural rubber, polyisoprene rubber, polybutadiene, styrene-butadiene-rubber, nitrile rubber, ethylene-propylene-diene-terpolymer (EPDM), chloroprene rubber and butyl rubber or mixtures thereof.

13. The method according to claim 11, wherein the carboxylic acid (a) of the vulcanization activator contains a radical R having from 7 to 11 carbon atoms.

14. The method according to claim 11, wherein the aromatic carboxylic acid (b) of the vulcanization activator is unsubstituted or substituted benzoic acid.

15. The method according to claim 14, wherein said substituted benzoic acid is selected from the group consisting of chlorobenzoic acid and methyl-benzoic acid.

16. The method according to claim 11, further comprising adding to the rubber and the vulcanization activator, a vulcanization accelerator which is selected from the group consisting of thiazoles and sulfenamides.

17. The method according to claim 16, wherein the vulcanization accelerator is 2-mercaptobenzothiazole (MBT), N-cyclohexyl-benzothiazolyl-sulfenamide (CBS), N,N-dicyclohexyl-benzothiazolyl-sulfenamide (DCBS), N-morpholinyl-benzothiazolyl-sulfenamide (MBS) or N-tert.-butylbenzothiazolyl-sulfenamide (TBBS).

18. The method according to claim 11, wherein said vulcanization activator comprises a homogeneous mixture of zinc octoate and zinc benzoate.

19. The method according to claim 11, wherein said vulcanization activator comprises a homogeneous mixture of zinc octoate and zinc 2-methylbenzoate.

20. The method according to claim 11, wherein said vulcanization activator comprises a homogeneous mixture of zinc octoate and zinc 2-chlorobenzoate.

* * * * *